INVENTORS
RENE A. HIGONNET
LOUIS M. MOYROUD
ELLIS P. HANSON
KENWAY, JENNEY, WITTER & HILDRETH
BY
ATTORNEYS

INVENTORS
RENE A. HIGONNET
LOUIS M. MOYROUD
ELLIS P. HANSON

Sept. 12, 1961  R. A. HIGONNET ET AL  2,999,434
APPARATUS FOR TYPE COMPOSITION
Filed Oct. 1, 1957  8 Sheets-Sheet 5

Fig. 5

INVENTORS
RENE A. HIGONNET
LOUIS M. MOYROUD
ELLIS P. HANSON
BY KENWAY, JENNEY, WITTER & HILDRETH
ATTORNEYS

Fig. 9

2,999,434
APPARATUS FOR TYPE COMPOSITION
Rene A. Higonnet, Cambridge, Mass. (% Graphic Arts Research Foundation, Inc., 58 Charles St., Cambridge 41 Mass.), Louis M. Moyroud, West Medford, Mass. (% Graphic Arts Research Foundation, Inc., 58 Charles St., Cambridge 41, Mass.), and Ellis P. Hanson, Rowley, Mass., assignors, by mesne assignments, to said Higonnet and said Moyroud
Filed Oct. 1, 1957, Ser. No. 687,572
17 Claims. (Cl. 95—4.5)

The present invention relates generally to photographic type composing apparatus, and more particularly to apparatus operated by memory means in which the selected characters of a line have been stored to provide the necessary controls for photography and spacing thereof on a sensitized sheet.

In the patent to Higonnet et al. 2,790,362 there is described a photographic composing machine which includes a continuously rotating character carrier upon which the characters are arranged with corresponding "slits," the slits comprising precise controls for triggering an intermittent character exposure flash device. Selection of the characters is provided by an electrical commutator decoder having a number of code input leads selectively energized by a register in accordance with the characters selected. An object of this invention is to provide improved apparatus for operation of a flash device of the type described in said patent.

An improved character disk is described in the application of Higonnet et al. Serial No. 526,493, filed August 4, 1955, now abandoned, whereby a number of different fonts of characters are arranged in concentric circles with provision being made to select the desired font. Another object of this invention is to provide controls for font selection in accordance with the teachings of said application.

A further object is to provide controls for operation of a lens turret of the type described in the application of Higonnet et al. Serial No. 610,336, filed August 11, 1945, now abandoned, whereby the characters may be photographically enlarged or reduced in size during projection.

A still further object is to provide controls for operation of character spacing mechanism of the type described in the application of Higonnet et al. Serial No. 590,304, filed June 8, 1956, now abandoned, and in the patent to Caldwell No. 2,670,665. In accordance with the teachings of said Patent 2,790,362, the character spacing mechanism is stationary during a time interval devoted to flash photography of the character, and is then moved intermittently after completion of photography according to the space allotted to the character. As in the Caldwell patent, the spacing is accomplished by means of a sliding prism reflector.

Further detailed disclosures of circuits and apparatus for sending keyboard-selected information to the memory devices are given in the application of Higonnet et al., Serial No. 531,023, filed August 29, 1955, in which the apparatus for computation of various justification requirements is described. In accordance with the teachings of the last-mentioned application, we preferably use multiple-circuit elements or "cards," associated with the keyboard, which provide codes for entry in the register and in the justification computing apparatus, the "cards" being described in the copending application of Higonnet et al. Serial No. 500,397, filed April 11, 1955, now abandoned. The objects of this invention include the provision of controls suitable for operation in conjunction with the apparatus of the two last-mentioned applications to form the main elements of a complete photocomposing machine. In addition, such objects include the provision of transcription apparatus operable by the coded information provided by the tabulation circuits of the application of Higonnet, Moyroud, Hanson and Manevitz Serial No. 687,571, filed on even date herewith, now Patent No. 2,910,163.

With the foregoing and other objects in view, the features of the invention comprise the circuits, apparatus, controls and modes of operation described below with reference to a preferred embodiment thereof, having reference to the appended drawings, in which.

*Block diagram*

Figure 1:
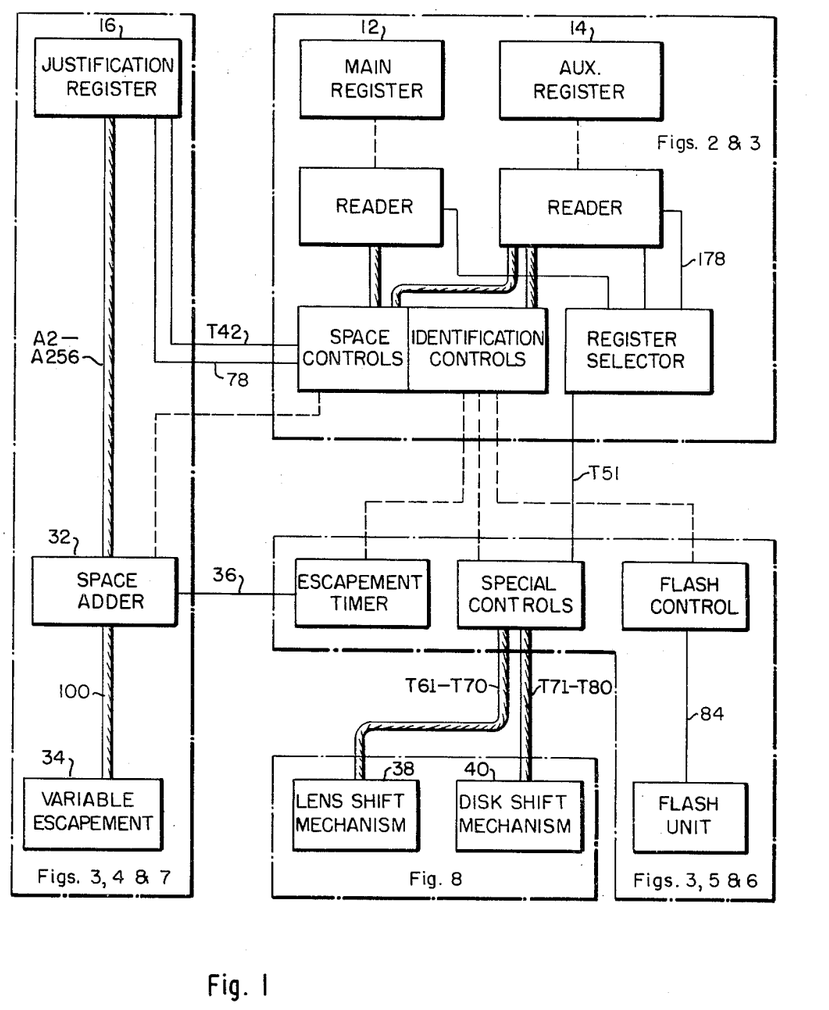
FIG. 1 is a block diagram illustrating the principal elements of the transcription apparatus according to this invention.
Figure 2:
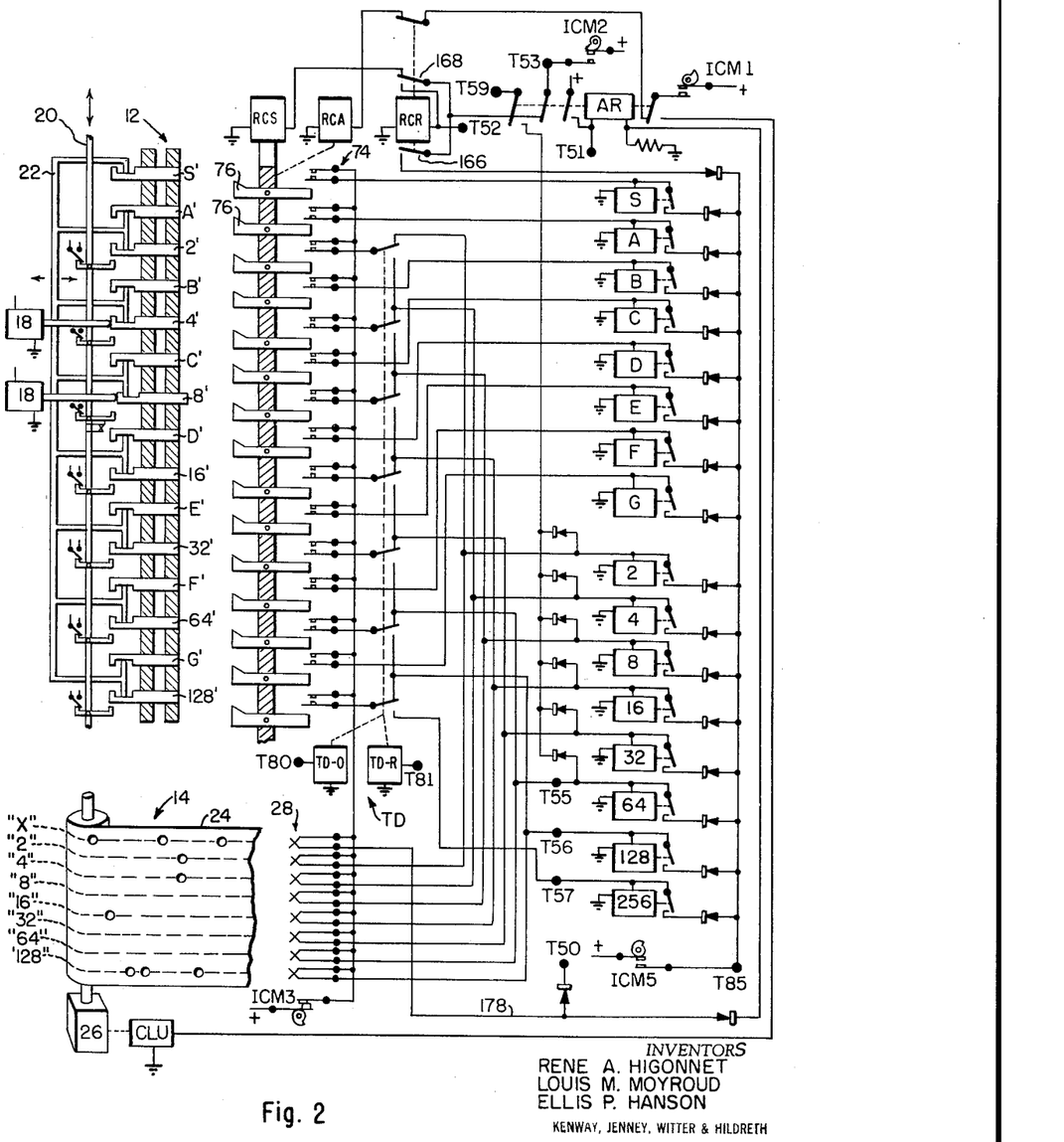
FIG. 2 is a schematic circuit diagram illustrating the main register and auxiliary register, the selection apparatus therefor and the repeating relays operated thereby.
Figure 3:
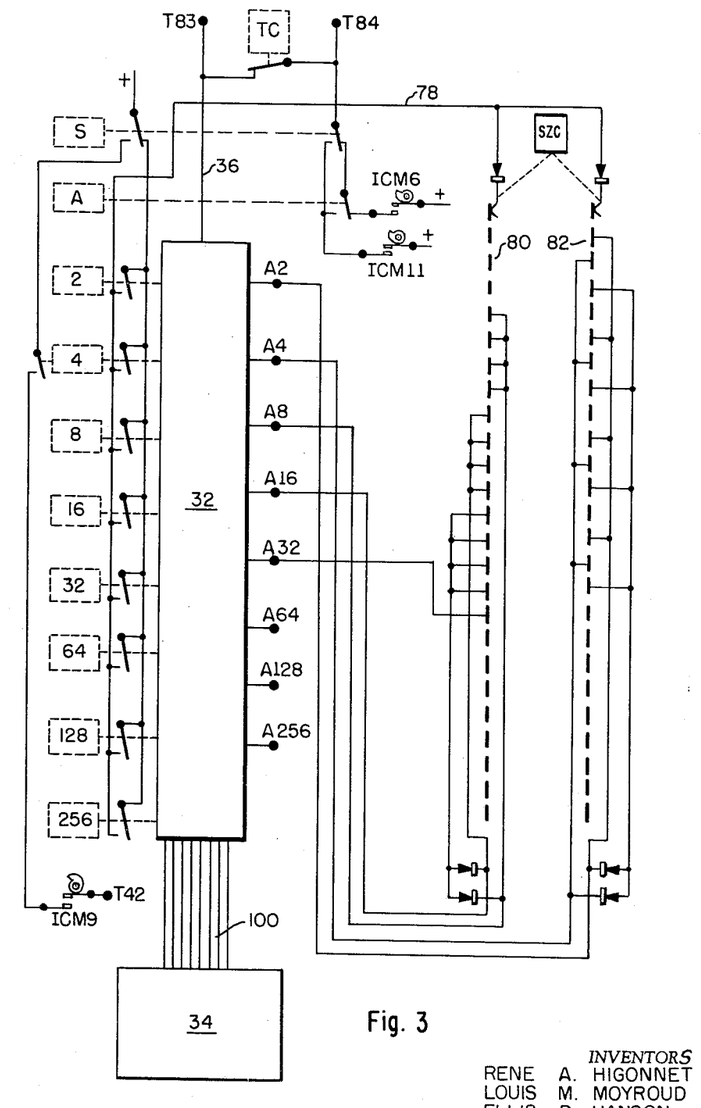
FIG. 3 is a circuit diagram of certain controls for operating the character spacing mechanism.
Figure 4:
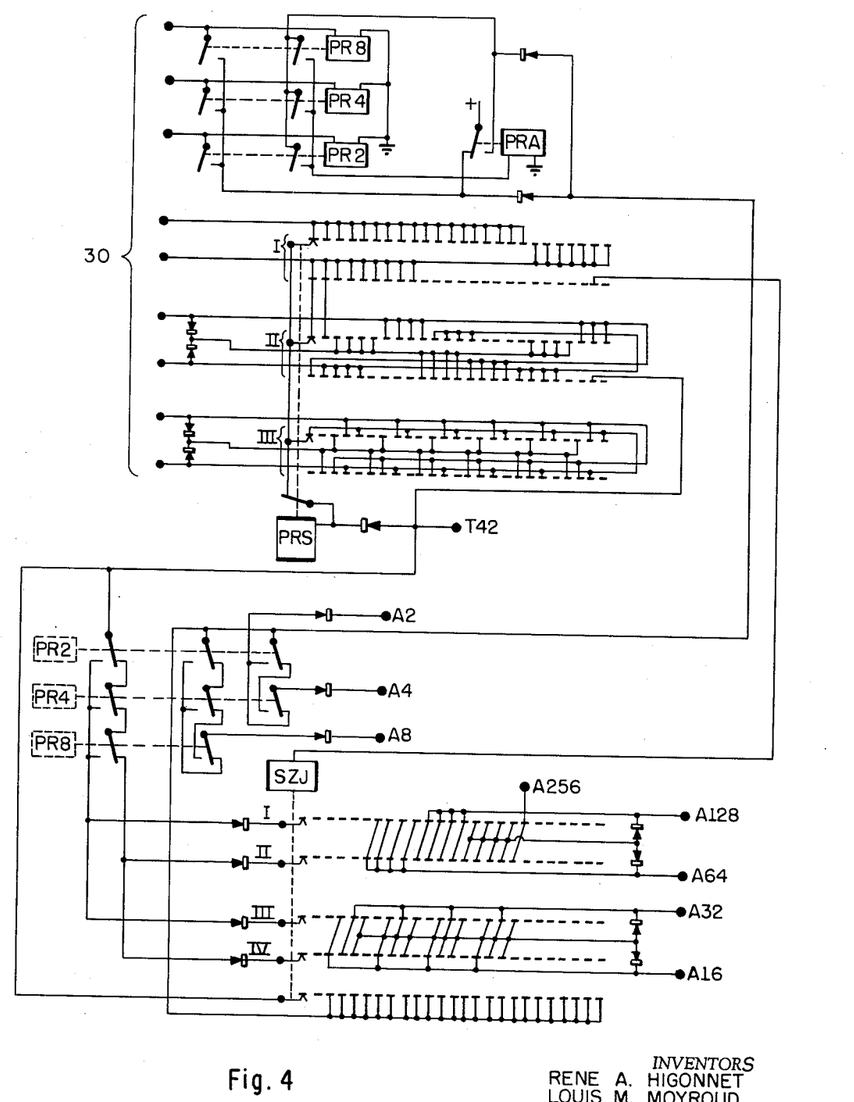
FIG. 4 is a circuit diagram of portions of the justification register.
Figures 6, 7:
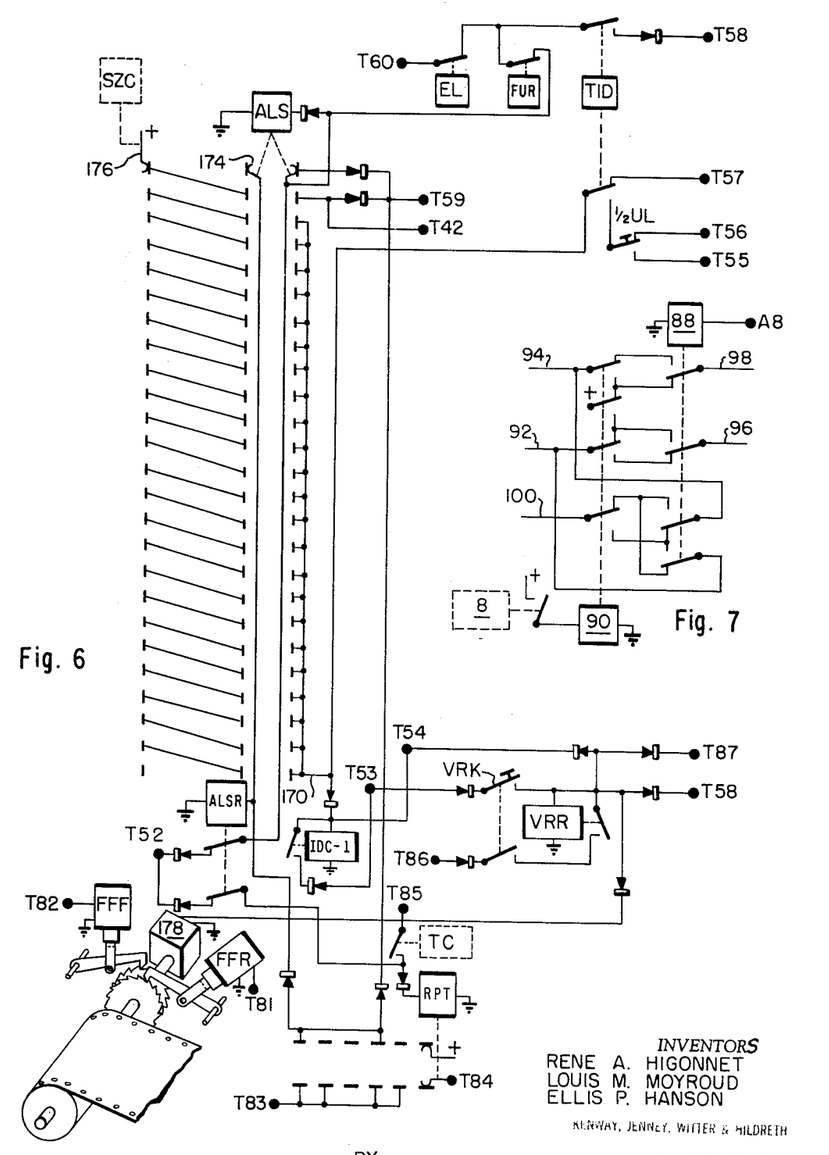
FIG. 6 is a circuit diagram of apparatus for controlling the insertion of space or leader characters sufficient to justify a line at any position therein selected by the position of a code in the register, and also circuits for unit leading and vertical ruling.
FIG. 7 is a detailed circuit diagram of a representative stage of the adder which sends information to the character spacing mechanism.

Referring to FIG. 1, the apparatus described herein is adapted for operation according to information stored in various forms, and more particularly in a main register 12, an auxiliary register 14 and certain switches of which various parts are shown in FIGS. 3, 4 and 6, collectively identified as a justification register 16. The main register 12 (FIG. 2) comprises a flat bed for supporting an array of code pins, as described in the patent to Higonnet et al. 2,690,249. The pins are arranged in columns with fifteen pins in each column, each pin being movable to an unactuated position and to an actuated position, both positions being stable. The pins of each column are designated as S', A', 2', B', 4', C', 8', D', 16', E', 32', F', 64', G', and 128'. The lettered pins are selectively depressed in codes by operation of the keys of the keyboard to provide character identification controls and special controls described below. The numbered pins are depressed to represent space or width values as determined by the keys of the keyboard, each pin designating a space value proportional to its reference number. During the recording of a line, combinations of hammer magnets 18 are energized, these magnets being operatively associated with a hammer carriage mechanically connected with the platen of a non-justifying typewriter associated with the keyboard. Thus as the line is typed, the hammer carriage magnets 18 become operatively associated with the pins of one column at a time, one column being used to store information corresponding to each selected character in a line of type, and additional columns of pins being used to enter other information for special controls, as determined by selected control keys of the keyboard, to perform various functions such as changes in the point size, special spacing operations, and other operations as described below in detail. Sensing means 20 and erasing means 22 are provided for removing information stored in the register in case of an error. Suitable controls for operating the correction apparatus during the storage of a line in the register are described in the patent to Higonnet et al. 2,682,814 and in said application Serial No. 531,023.

The auxiliary register 14 preferably comprises a paper tape 24 having a conventional stepping ratchet drive 26 operated by a clutch CLU. During the storage or composition of a line by the operator, the tape 24 is perforated by eight punches in positions designated "X," "2," "4," "8," "16," "32," "64," and "128." the numbered positions containing space information in the same manner as the numbered positions of the register 12 and the "X" position longitudinally separating portions of the tape so that each portion contains punches relating to a common spacing operation. The operation of the tape perforator is associated with tabulation operations described in said application filed on even date herewith. Brushes 28 are disposed across the tape to make contact through the perforations.

The justification register 16 comprises certain stepping switches and relays which are fully described in said application Serial No. 531,023. The stepping switches include switches SZC, SZJ, and PRS (FIG. 4) corresponding to the switches with similar identification in said application. Also, relays PR2, PR4, PR8, and PRA correspond with similarly designated relays of said application. As therein described, these switches and relays are stepped and energized during the calculation which follows the storage of a line and precedes its photographic transcription, whereby for purposes of the present description, they are assumed to have reached positions which represent the spacing operations necessary to justify the line. The switch SZC is stepped by the circuit associated with it in FIG. 5 of said application Serial No. 531,023, and the switch SZJ is similarly stepped by the circuit shown in the last-mentioned figure. The switch PRS and the relays PR2, PR4 and PR8 will have been stepped and energized through nine terminals 30 designated T25 to T33 in FIG. 7 of said application Serial No. 531,023. Details of the transcription circuits operated through the positions of these switches and relays are given below.

The justification register 16 is connected by terminals A2 to A256 to a binary relay adder 32 (FIGS. 1 and 3), of which a detailed view representing a single state is given in FIG. 7. The adder is electrically connected to a variable escapement 34 which is preferably the escapement shown in said application Serial No. 590,304. The connections are preferably made directly to the magnets M2 to M128 in FIG. 2 of said application.

Figure 5:
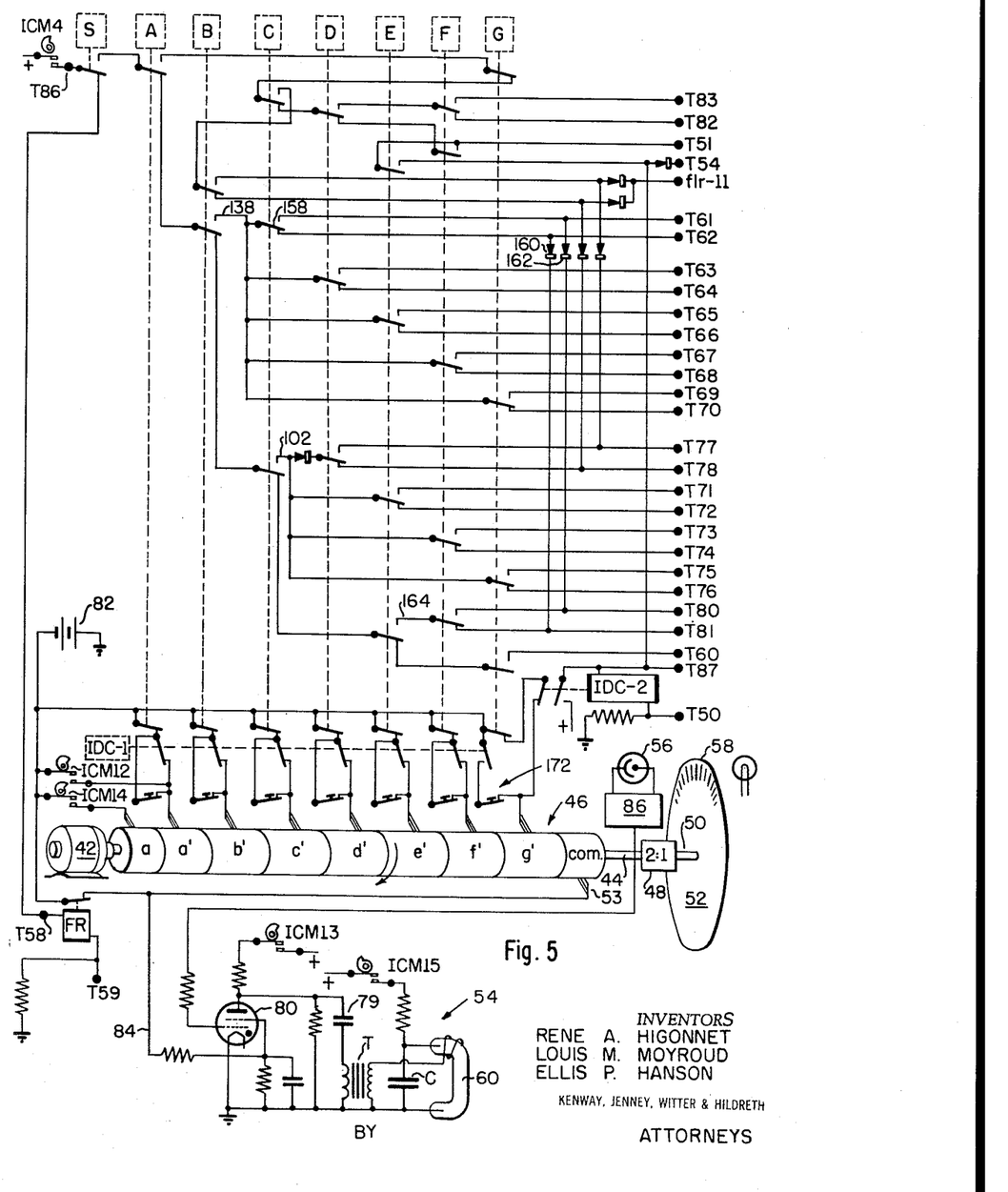
FIG. 5 is a circuit diagram of control circuits operated by the registers according to keyboard-selected information, including the flash control circuits.

FIG. 2 shows the reading means associated with the main and auxiliary registers, register repeating relays S, A, B, C, D, E, F and G comprising the identification controls, and other register repeating relays 2, 4, 8, 16, 32, 64, 128 and 256 comprising the space controls. A relay AR constitutes a register selector which connects either the main register or the auxiliary register alternatively to the repeating relays. In transcribing a typical character the photographic projection and spacing are accomplished consecutively, the spacing being timed through cam contacts as further described below, these contacts being connected to the space adder 32 through a lead 36. FIG. 5 illustrates the flash control, the flash unit and terminals through which special controls are effected. Special control signals derived from identification repeating relay contacts shown in FIG. 5 operate a lens shift mechanism 38, a disk shift mechanism 40 (FIG. 8) and other circuits described below.

We next turn to a description of the apparatus which controls the timing of the various transcription operations. A flash decoder 46 (FIG. 5) is supported on the shaft 44. The shaft 44 is coupled through a disk shift gear mechanism 48 to a shaft 50 which rotates at half the speed of the shaft 44. The shaft 50, also illustrated in FIG. 8, supports a character disk 52 which is described in detail in said application Serial No. 526,493. On this disk there are eight concentric circles of characters with two separate, complete fonts arranged consecutively on each half-circle, making a total of sixteen fonts. It will be understood that while the axis of the shaft 44 is preferably fixed, that of the shaft 50 is rotatable about a pivot as fully described in said last-mentioned application. The mechanism 48 is shown in FIG. 4 thereof, in which the reference number 70 designates the decoder 46 of the present application, and the shafts designated 62 and 36 therein designate the shafts 44 and 50 hereof, respectively. The shaft 44 rotates a set of coded conductive segments $a$, $a'$, $b'$, $c'$, $d'$, $e'$, $f'$, and $g'$, beneath a set of brushes as fully described in said Patent 2,790,362, whereby a circuit to a common brush 53 may be interrupted at a selected position of the shaft to position a given character for photography. The disk 52 which carries the characters past a projection position (not illustrated) moves the selected character through said position during the corresponding interval of time. The interruption of the circuit through the decoder 46 prepares a flash circuit designated generally as 54, and a photocell 56 operative by light passing through slits 58 associated with each character sends a trigger impulse to the flash circuit to ignite an intermittent flash tube 60 disposed to throw light upon the disk 52, all as described in said last-mentioned patent. The light is projected to a sensitized film through the apparatus described in the patent to Caldwell 2,670,665, which discloses a sliding prism reflector engaged with a variable escapement for spacing the characters in a line. The optical path includes a selected lens such as 62 (FIG. 8) on a lens turret as described in said application Serial No. 610,336.

Figure 8:
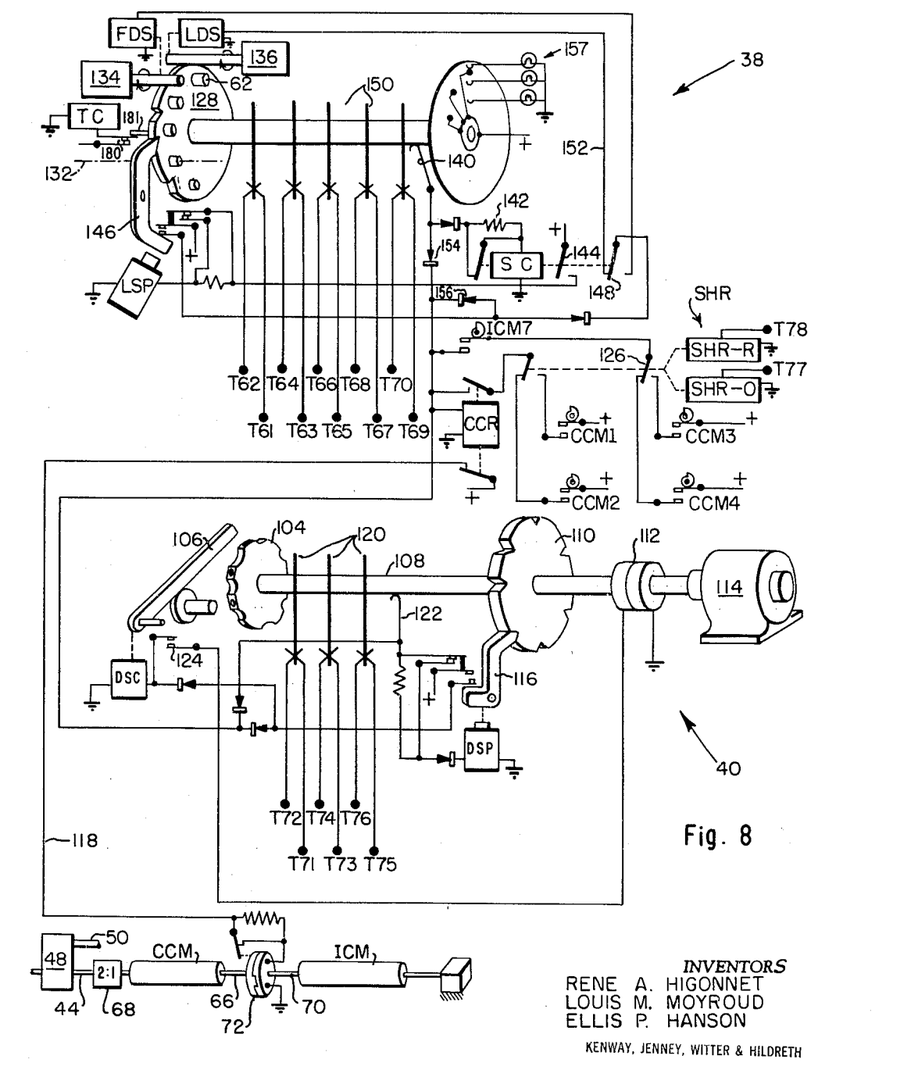
FIG. 8 illustrates apparatus and control circuits for lens and font selection.

Referring to FIG. 8, the shaft 44 continuously drives a shaft 66 through a gear box 68, whereby the shafts 50 and 66 rotate continuously at the same speed. The shaft 66 is normally coupled to a shaft 70 through a clutch 72. The continuously rotating shaft 66 supports continuous timing cams CCM and the shaft 70 supports intermittent timing cams ICM, these cams being adapted to close circuits according to the timing diagram, FIG. 9. Also, FIG. 9 illustrates in dotted lines the periods during which the flash decoder segments $a$ and $a'$ (FIG. 5) are connected to the commutator "com."

Figure 9:
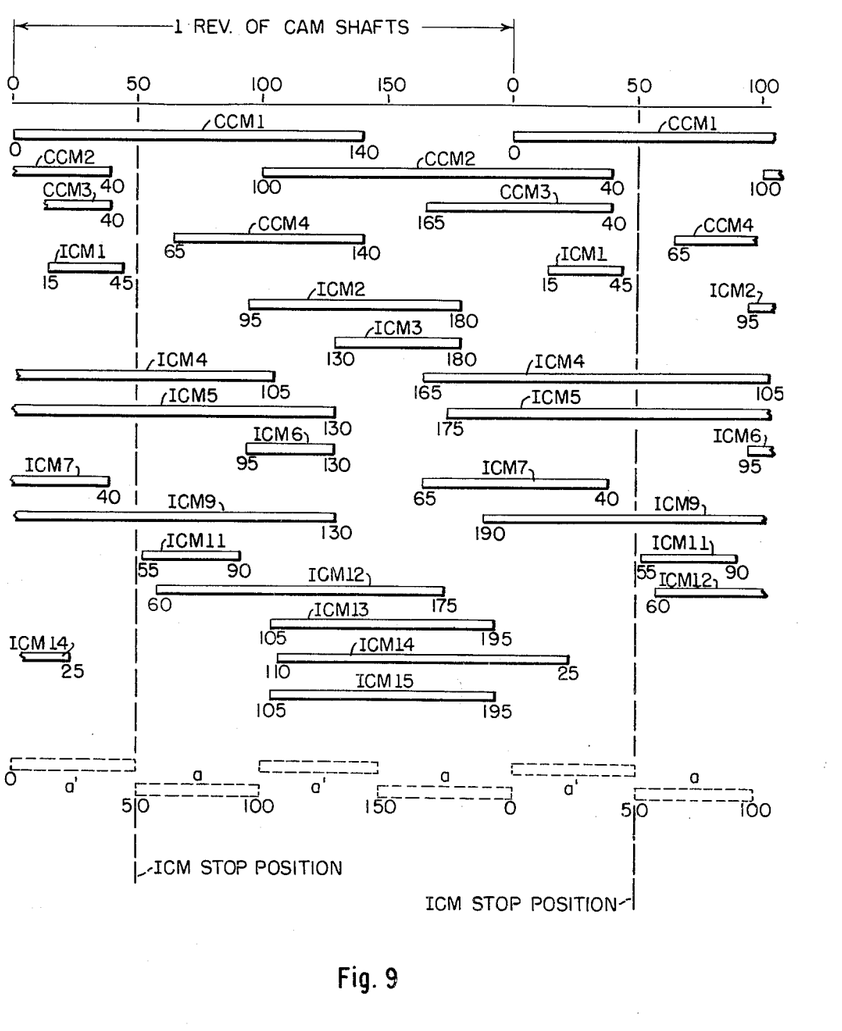
FIG. 9 is a timing diagram illustrating the relationship of contacts closed by intermittent and continuous cams illustrated generally in the lower part of FIG. 8.

Referring more particularly to FIG. 9, a single revolution of the intermittent cam shaft 70 is marked off on a scale of "200." It will be understood that one revolution of the cam shaft corresponds with one revolution of the character disk 52 and two revolutions of the flash decoder 46. The operations of the circuits herein described are identified below by the scale positions of the cams through which the circuits are operative.

In general, the circuits herein described are illustrated in the drawings according to the convention that relay contacts are illustrated in their positions reached when the corresponding relay coils are unenergized except as noted. We turn next to specific descriptions of the various operations of transcription.

*Characters and spaces*

The most common operation of transcription is that of photographing a selected character and operating the variable escapement according to its corresponding width. This is accomplished as follows.

First, assume that a register sensing carriage bearing contacts 74 and feelers 76 (FIG. 2) in the register 12 is opposite a set of pins depressed to represent a character of lower case. The code of such a character in no case involves depression of the pins S' or A'. At the time "95," a circuit is closed through cam contacts ICM2 to the coil of a reading carriage sensing magnet RCS which lifts the feelers 76 to cause them to be operatively associated with the pins of the register. This closes a corresponding combination of the sensing contacts 74 which are each connected by one contact to a corresponding repeating relay. The other contacts of the sensing circuit are connected in common through cam contacts ICM3 at the time "130" to supply a voltage to the repeating relays corresponding to closed sensing contacts 74. Referring to FIG. 3, operation of any of the width repeating relays 2 to 256 energizes a lead 78 connected through rectifiers with the brushes of the switch SZC. If the switch is in a position other than the position illustrated, which is a condition arising from operation of the circuits of said application Serial No. 531,023, a space code will be sent through contacts of levels 80 and 82 of said switch to terminals A2, A4, A8, A16 and A32 of the adder 32. The space thus entered is retained temporarily in the adder and represents an increment of space to be added to the normal space allotted to the character for purposes of justification. At the time "175" the repeating relays are supplied with a locking voltage through cam contacts ICM5. At the time "180" the register sensing apparatus is freed for subsequent stepping to the next register position by the disconnection of circuits through cam contacts ICM2 and ICM3.

As shown in FIG. 3, the energization of the width repeating relays will have entered width information in the adder 32 in accordance with the binary value represented in the register position. Thus when the index position "0" is reached, the normal character width and the intercharacter justification width, if any, have been sent to the adder and the circuits have been prepared for photography of the character.

As stated above, the character disk 52 preferably carries twice as many fonts of characters as there are circles thereof, each circle having two fonts on opposite halves thereof. Furthermore, the upper case characters of each font are arranged to pass the projection position at times "0" to "50" and "100" to "150" of the cam shaft 66, the lower case characters passing the projection position at times "50" to "100" and "150" to "200". In the assumed case of a lower case character, its photography will occur at some time in the ensuing period "50" to "100". (It will be understood that the period "150" to "200" corresponds to characters of the other font which is not to be projected. Circuits to prevent photography of these latter lower case characters are described below.)

During the period prior to the time "0" described above, circuits through cam contacts ICM13 and ICM15 (FIG. 5) will have been completed to prepare the flash circuit 54 by charging condensers C and 79 and applying a plate voltage to a gas-filled trigger tube 80. This occurs during the interval "105" to "195." The flash circuit is provided with a bias battery 82 which is arranged to be connected by a lead 84 to a grid of the tube 80. The application of this voltage to the lead 84 suppresses operation of the tube 80. The connection of the battery 82 to the lead 84 may occur over any of several paths. One path passes through break contacts of a relay FR. At the time "165" this relay will have become energized through cam contacts ICM4 and break contacts of the repeating relay S. During the ensuing time "0" to "50" during which the capital letters are passing the projection position, a parallel path from the battery 82 to the lead 84 is found through the decoder a' thus suppressing operation of the flash tube. However, at the time "50" the decoder a' opens its circuit. The connection between the battery 82 and the lead 84 now continues to be made through some combination of the break contacts of repeating relays B to G and their corresponding code segments. All of these parallel paths are finally broken only during that interval of time in which the selected character passes in projection position. Thus it is only at this time that the suppressing bias on the lead 84 is removed to permit an impulse from the photocell 56, passing through an amplifier 86, to trigger the tube 80 which sends an impulse through a transformer T to trigger the tube 60 and discharge the condenser C therethrough. It will be understood that the flash decoder 46 opens the suppressing bias circuit for a relatively longer period of time than the practically instantaneous interval of the photocell trigger impulse. In any case, the character will have been flashed by the time "100."

The codes are so arranged that following the flashing of the selected character and before the time "100" there will ordinarily be other interruptions of the flash suppression circuit. These are not effective to cause a flash because the charge on the condenser 79 which provided a plate supply for the tube 80 has been discharged by the first flash.

Following the flashing of the character, the adder will be energized to produce a corresponding spacing movement of the variable escapement. However, the register reading mechanism does not remain idle until completion of this spacing movement. At "15" the reading carriage advance magnet RCA will have been energized through cam contacts ICM1 (FIG. 2) which is closed until the time "45." This steps the reading carriage to the next column of pins and prepares the sensing contacts 74 for initiation of the reading of a new character at the time "95" as described above.

Referring again to the character which has just been flashed in the period "50" to "100," it is spaced by an impulse through cam contacts ICM6 passing through break contacts of the relays S and A to the lead 36 for energizing the adder 32. The internal circuit of the adder may take any desired form, for example that illustrated in FIG. 7 and further described below. In any case, the impulse on the lead 36 causes the sum of the entries on the leads A2 to A256 and 2 to 256 to be sent to the variable escapement 34 in binary form, this escapement being adapted to translate the space thus represented mechanically to the desired movement of the prism carriage. Details of the mechanical aspects of this operation are given in said application Serial No. 590,304. The spacing movement will have been completed by the time "130" and as described above, the sensing contacts for the next character will have sensed its code through operation of the solenoid RCS. As pointed out above, the cam contacts ICM5 provide a holding circuit for the repeating relays energized for the first character. These latter contacts open at the time "130," which is the same time at which the cam contacts ICM3 close the circuits through the sensing contacts 74 for energizing the repeating relays for the next character. The result is that any repeating relay that has been energized by the first code and which is to be energized by the second code does not become deenergized when the contacts ICM5 open, but rather continues to be held through the contacts ICM3. By this means unnecessary repeated operations of a relay for successive characters is prevented.

The flash decoder rotates at twice the speed of the character carrier and passes through one revolution while the selected font passes through the projection position and one revolution while the opposite font passes through this position. By means of cam contacts ICM12 and ICM14, provision is made to maintain the flash disabling circuit closed during the entire decoder revolution in which the unwanted font is in the projection position. Thus a series circuit is provided through the contacts ICM12 and the segment a' during the interval "100" to "150," and a series circuit is provided through the contacts ICM14 and the decoder segment a during the interval "150" to "200." In order to flash a character on the disk which passes the projection position in the interval "100" to "200," it is necessary to shift the phase of the intermittent cam shaft 70 in relation to the continuous cam shaft 66 through operation of the clutch 72 in a manner described more fully below.

We next turn to the transcription of an upper case character. This character is characterized by energization of the repeating relay A without energization of the relay S. The operation of the sensing contacts 74 and energization of the repeating relays occur as described above, these operations being completed by the time "165." The circuit through the lead 78 (FIG. 3) and the levels of the switch SZC to the adder 32 are completed in the same manner as for lower case characters.

At "175" the holding circuit for the repeating relays through the contacts ICM5 (FIG. 2) is completed. By the time "0" the circuits will have been prepared for flashing the character. In this case, the flash occurs in the interval "0" to "50," that is, during the interval in which the connection through the decoder segment $a'$ is interrupted. The operations of the decoder and flash circuit are otherwise the same as for a lower case character. However, the timing of the spacing mechanism which follows differs due to the transfer of the lead 36 (FIG. 3) from the cam contacts ICM6 to cam contacts ICM11 by operation of the relay A signifying capital letters. The latter contacts close at the time "55," or immediately after all of the capital letters have passed the projection position. This advancement of the spacing operation is due to the necessity for allowing additional time for the relatively larger spacing movements required by capital letters, and is employed also for special operations having the code "S."

In said application Serial No. 531,023, there is described a "fixed space" circuit, whereby the operator may utilize a column of pins in the register to store a designated space which is not to be altered by the justification requirements of the particular line. Such a space is entered by means of "fixed space" keys which send to the register a code which will energize the repeating relay S and any one of the space code relays 8, 32, 64 or 128. When such a code is sensed during the transcription period, the operations described above are modified in two respects. First, as shown in FIG. 3, energization of the relay S opens the circuits to the lead 78 to prevent entry of the intercharacter justification increment to the adder. The adder thus receives only the space entry read from the space repeating relays. Secondly, no character is flashed because the interruption of the energizing circuit for the relay FR (FIG. 5) holds the disabling circuit for the flash tube closed irrespective of the decoder position.

As described in said application Serial No. 531,023, a position of the register is used to signify the operation of the space bar. This operation enters in the register a code which will cause operation of the repeating relays S and 4. When this code is sensed a circuit is prepared (FIG. 3) through cam contacts ICM9 to a terminal T42. This circuit is closed at the time "190." The terminal T42 is connected to the justification register 16 as indicated in FIG. 4. It is identical with the similarly-designated terminal in FIG. 7 of said application Serial No. 531,023. As described in said application, an impulse applied to this terminal causes the introduction of an increment of space in addition to the value "4" to each interword space. In general, the increments are not equal throughout a given line, but are varied. In any case, they cause the line to be exactly justified. In said application the circuits from the terminal T42 are traced to variable escapement magnets VE2 to VE128 directly. In the present instance, the connections are made instead to terminals A2 to A256 of the adder (FIG. 3). Since no character is to be flashed in this operation, the entire period from the time "190" to "130" is devoted to the space increment entry. However, the variable escapement movement is not initiated until the time "55" when the cam contacts ICM11 are closed to energize the lead 36.

Adder

As described above, the adder 32 is adapted to add the binary numbers indicated by the energized space repeating relays 2 to 256 and the energized leads A2 to A256, sending a binary sum to the variable escapement 34. Any suitable adder may be employed for this purpose, but the preferred form is illustrated by a typical binary stage of order "8" in FIG. 7. The terminal A8 is connected with relay 88, and the register repeating relay 8 through make contacts energizes a relay 90. A lead 92 is connected with the next lower order stage and a lead 94 is also connected to the next lower order stage, the leads 92 and 94 being energized in the presence and absence, respectively, of a carry voltage from said stage. Similarly, a lead 96 indicates a carry from the stage "8" and a lead 98 indicates the absence of a carry voltage from the stage "8." A lead 100 indicates the presence of a digit of value "8" in the sum and is connected with the variable escapement 34. In accordance with the theory of binary additions, there are eight possible conditions of the stage "8," and an analysis of the circuits through the contacts of the relays 88 and 90 reveals that the appropriate lead or leads 96, 98 and 100 are energized in each case to indicate the presence or the absence of a carry-over to the next higher order stage and the presence or absence of the digit "1" of the corresponding order in the sum.

Change of font

We next turn to a description of the special operation whereby the font selected for projection is changed. It will be understood that the change may require simply the selection of the opposite font on the same circle of characters, or the selection of a font on a different circle of characters with or without a half-revolution shift from the original font. Referring to FIG. 5, the necessary operations are effected by a register code which causes energization of the repeating relays S and C without energization of the relays A and B. At the time "165" the cam contacts ICM4 are therefore connected to a lead 102. The connections from this lead extend to some combination of terminals T71 to T78, depending upon the positions of the relays D, E, F and G. These latter relays provide sixteen possible combinations in which these terminals are energized, and each of these combinations corresponds with a particular font. In the preferred embodiment, the character disk 52 has eight concentric circles of characters with two fonts in each circle. The codes are so arranged that the relays E, F and G are used to differentiate the rings of characters, and the relay D is used to differentiate the two halves of each circle. The connections to the font selection mechanism are shown in the lower part of FIG. 8. There is shown a "potato cam" 104 corresponding to the cam designated 56 in FIG. 4 of said application Serial No. 526,493. A lever 106 corresponding to the lever 54 of said application is adapted to rest upon a selected point of said cam so as to rotate the disk assembly to present the selected circle of characters in the projection position. Details of the mechanism are fully described in said application. The cam 104 is secured to a shaft 108 to which is also secured a detent wheel 110. The shaft 108 is coupled through a clutch 112 to a continuously driven motor 114.

The operation involving a change of the circle of characters to be photographed involves lifting the arm 106, raising a pawl 116 which holds the shaft 108 in a precisely determined position, engaging the clutch 112 to rotate the cam 104, stopping the cam 104 in position to arrest the lever 106 when the selected font of characters intersects the projection axis, releasing the pawl 116 in the corresponding notch, and lowering the arm 106 against the cam 104. The operation involving a shift of 180 degrees, with or without the foregoing operation, involves releasing the clutch 72 which engages the intermittent cams by disconnecting a lead 118 connected through break contacts of a relay CCR to a voltage source. When the clutch 72 is deenergized in this manner, suitable means of a conventional type are provided thereon to interrupt the intermittent cam shaft 70 at time "50" as indicated by vertical broken lines in FIG. 9. While thus disconnected the intermittent cams hold their contacts as indicated at time "50," and this continues until the clutch 72 is reenergized.

The operation of the disk level shift is described as follows: Upon energization of some combination of the terminals T71 to T76, a circuit is completed from one or more of these terminals through three code disks 120 of conventional printed-circuit form to a brush 122 to energize a disk shift pawl DSP and the relay CCR. Movement of the pawl 116 away from the detent disk 110 causes make contacts associated with the pawl to energize a magnet DSC which preferably takes the form of a half-turn clutch arranged to lift the arm 106 from the cam 104. The arm is thus held until the "potato" cam is rotated to the desired position. Operation of the latter magnet also closes contacts 124 to energize the clutch 112. The cam 104 and code disks 120 now rotate until the circuit from the terminals T71 to T76 leading through the decoder disks to the brush 122 is interrupted. This releases the magnet DSP and allows the pawl 116 to fall against the edge of the disk 110 between adjacent notches. With the pawl in this position, its make contacts continue to be closed and rotation of the cam 104 continues. When the next notch is reached, the pawl 116 drops into it and opens its make contacts to deenergize the magnet DSC and the clutch 112. Thus the cam 104 has been selected and accurately located and the arm 106 is lowered against it to position the character disk.

It will be understood that although the disk level shift operation may require considerable time, the intermittent cam shaft 70 has remained stationary with the cams in position "50." This interruption has been brought about by energization of the relay CCR. The relay CCR is first energized at time "165" through the above-described chain of operations resulting from closure of the cam contacts ICM4 (FIG. 5). The clutch is constructed so as to disengage the shaft 70 at the next time "50" where it remains until the new disk level is selected. The phase relationship of the shafts 66 and 70 when they are reengaged depends upon the moment of release of the relay CCR. This relay has a holding circuit including transfer contacts of a half-turn selection relay SHR with contacts connected to continuous cam contacts CCM1 and CCM2. The opening of circuits through these cam contacts occurs at times "140" and "40," respectively. The relay SHR comprises two coils, namely, SHR-R and SHR-O. These coils are so arranged that energization of the former brings the transfer contacts to the position illustrated where they remain until energization of the latter, and vice versa. These coils are energized through terminals T78 and T77 depending upon the position of the repeating relay D. The relay D is energized for every font code combination corresponding to the eight fonts located on one half of the disk 52. The deenergized position of the relay D corresponds to fonts on the other half of the disk. If the terminal T78 had been energized by the previous font code (prior to the one under discussion), the present font shift code does not change the position of the SHR transfer contacts and the relay CCR holds through the cam CCM2. Once the energizing circuit of the relay is opened by completion of the font selection operation, the relay releases when the cam contacts CCM2 open. Mechanical engagement of the continuous and intermittent cam shaft then occurs and the two cam shafts are again engaged in the same phase relationship as existed prior to the font shift operation.

On the other hand, if the new font shift code energizes the terminal T77, the transfer contacts of the relay SHR move to their opposite positions, thereby completing the holding circuit for the relay CCR through the contacts CCM1. In that case, the relay becomes deenergized when the latter contacts open at a time one-half revolution of the continuous cam shaft later than its deenergization described above when the contacts CCM2 are in the circuit. It will be understood that when the clutch 72 is reengaged the two cam shafts will be reengaged in 180 degree phase shifted relationship with the flash control apparatus operative upon the font disposed on the opposite half of the disk 52 from the font previously photographed.

A supervisory control over the phase relationship of the continuous and intermittent cam shafts is provided by transfer contacts 126 of the relay SHR. It will be understood that the two positions of these contacts correspond to the two halves of the disk 52, and also to the alternative phase relationship of the continuous and intermittent cam shafts. When the phase relationship of the cam shafts corresponds with the position of the contacts 126, closure of cam contacts ICM7 and CCM4 occur out of phase so that no circuit is connected through them from the voltage source to the coil of the relay CCR. However, if the phase relationship of the cams is opposite, a circuit is completed through the cam contacts ICM7 and CCM4 to energize the relay CCR which then holds on the cam contacts CCM1 or CCM2, as dictated by the position of the relay SHR. When the contacts 126 are in their opposite position, the cam contacts CCM3 are operative in a similar manner to produce the opposite phase relationship of the cam shafts.

It will be understood that the previous operation not only provides a supervisory control, but also accommodates that condition in which the change-of-font involves only a shift to the other font on the previously selected circle of characters. In that case, the "potato" cam is not rotated, but the contacts 126 change to the opposite position.

Lens shifts

As described in said application Serial No. 610,336, a lens turret 128 (FIG. 8) is preferably interposed in the optical projection system. This turret supports a plurality of lenses 62, and provision is made for rotation of the turret to present a selected lens in a projection axis 132. It will be understood that in accordance with the teachings of the Caldwell Patent 2,670,665, the selected lens is situated between the character carrier 52 and the sliding prism arrangement of said patent, whereby the selected character may be projected in any desired point size upon the film. The selection of point size is determined by a code entered in a separate position of the register by the operator during storage of the line. The point size may be changed at any position in the line, if desired. Movement of the turret 128 is accomplished by either of two drive mechanisms 134 and 136 having continuously rotating rollers adapted to engage the periphery of the turret frictionally upon energization of corresponding solenoids FDS and LDS. The drive 134 is a fast drive which is engaged with the turret during the initial movement thereof, and as the turret approaches a selected position it is disengaged and the drive 136 is engaged until the shift is completed.

The registered code for a lens shift is characterized by the energized condition of the repeating relays S and B and the unenergized condition of the relay A. Referring to FIG. 5, it will be seen that a lead 138 will be energized by this code. This lead is connected with a combination of terminals T61 to T70 depending upon the positions of repeating relays C, D, E, F and G.

At the time "165" the voltage on the lead 138 is connected through the terminals T61 to T70 according to the combination of the desired lens code. If this code differs from that of the lens in the axis 132, the voltage appears at a common brush 140 and energizes a relay SC (FIG. 8). It will be noted that energization of this relay opens its break contacts to insert a resistance 142 in series with the operating coil. The function of this resistance is to cause the relay to drop out more readily when the energizing voltage is subsequently removed.

Make contacts 144 of the relay SC apply an energizing voltage to a pawl magnet LSP which lifts a pawl 146 from the disk 164. This movement of the pawl connects a voltage through make contacts associated therewith and a make contact 148 to the fast drive solenoid FDS. The turret begins to rotate and code disks 150 similar to the disks 120 of the disk shift rotate until the connection to the common brush 140 is interrupted. This immediately releases the relay SC which opens the circuit to the pawl magnet LSP, and the pawl 146 falls upon a flat between the selected notch and that notch which precedes it. Since the pawl is not fully returned to its stop position, the make contacts associated therewith remain closed, but the voltage connected therethrough passes through a break contact 152 of the relay SC to energize the slow speed solenoid LDS. The final movement continues at slow speed until the pawl 146 falls into the selected notch, at which time the circuit to the solenoid LDS is interrupted.

Connections through rectifiers 154 and 156 apply an energizing voltage to the relay CCR during the entire lens shift operation, and this relay disengages the intermittent cam shaft ICM, reengaging it upon completion of the lens shift in the same manner as described in the preceding section. It will be recognized that it is also possible to interrupt the reading carriage sensing and advance operations by a relay instead of disconnecting the intermittent cam shaft. This relay would also maintain a voltage on the terminals T85 and T86. The fast and slow speed drives are provided to minimize the shock of rotating the lens turret and stopping it in precisely defined positions.

In order to enable the operator to see which lens is in the axis 132, a number of lights 157 are provided. These are illuminated by segments on a disk pinned to the same shaft as the lens turret, each segment being in position to close a circuit through a brush to a corresponding light when a corresponding lens is in this axis.

Double set shifts

The point sizes for some of the lenses 130 discussed in the preceding section are such that each character requires a considerable space. For this reason it is convenient to store only one-half the space required for each character in the register when a point size above a certain value has been selected. In such a case, provision is made to double the space stored in the register when the character is transcribed. This doubling is accomplished by means of the lens shift code. Thus each lens for which doubling of the register value is required is assigned a code which causes energization of the repeating relay C. Referring to FIG. 5, the position of transfer contacts 158 therefore indicates whether or not the register space value is to be doubled. These contacts are connected through rectifiers 160 and 162 to terminals T80 and T81. These terminals are connected respectively to coils TD-O and TD-R of a relay TD which is of the same type as the relay SHR discussed in connection with FIG. 8. When the selected lens shift code does not energize the relay C, the terminal T81 is energized to cause the relay TD to reach the illustrated position in which normal register values are transferred to the repeating relays 2 to 128. This position of the relay TD continues until the terminal T80 is energized by a code calling for transcription doubling. This code transfers the register sensing contacts to the repeating relays 4 to 256; hence, the transcribed character is given twice the space indicated in its register position.

In certain cases, the machine operator may wish to provide for transcription doubling with a lens having a code that does not cause energization of the coil TD-O. Also, where transcription doubling has been effected in this manner, it may be desired to restore normal transcription spacing without requiring a lens shift. These results are accomplished by recording a code calling for energization of the repeating relays S and E, which causes energization of a lead 164. If the relay F is also energized, the terminal T80 sends a voltage to the relay TD to double the register values. If the relay F is not energized by the code, the terminal T81 sends a voltage to restore normal space transcription.

Justifying leaders

In said application Serial No. 531,023, apparatus is described for storing information in the pin register and in the switches and relays comprising the justification register when the operator wishes to insert a space or a number of leader characters at some point in the line, such space or characters being sufficient to fill the line to justified length. The information in the pin register comprises a code "SG," that is the repeating relays S and G are energized when the code is read at the selected point in the line. Information is stored in the justification register during computation as there described by stepping the switch SZC (FIG. 6.) a number of times equal to the number of leader spaces or characters of size "256", "128" or "64" required, and stepping the switch SZJ and energizing the relays PR2, PR4 and PR8 to indicate the additional, smaller space required, if any, to justify the line exactly. The space represented by each step of the switch SZC depends on the operation of certain keys depressed during storage of the line, and in the present description the three possible spaces are represented by the positions of a key "½ UL" and a relay TID (FIG. 6). The relay TID is provided with the energizing circuit shown in FIG. 8 of said application Serial No. 531,023 and is in an energized condition during the transcription process herein described if leader characters are to be inserted. In that case the characters are spaced "64" units apart if the key ½ UL is depressed (see also FIG. 6 of said application) and "128" units apart if it is not depressed. If no leader characters are to be inserted the relay TID is not energized and each step of the switch SZC represents "256" units of space.

We turn next to a description of the transcription operations for these cases. These are initiated by energization of a terminal T60 (FIG. 5) at the time "165." The impulse passes through break contacts of relays EL and FUR (FIG. 6) described in said application and assumed herein to be unenergized, to the coil and one brush of a stepping switch ALS, and through a terminal T52 to the coil of a relay RCR (FIG. 2). If the relay TID is energized the impulse also goes through a terminal T58 to the coil of the relay FR. The relay RCR opens the circuits to the reading carriage sensing and advancing magnets RCS and RCA and connects the contacts ICM2 through its make contacts 166 to the repeating relay holding circuit. Since this circuit is also connected to the contacts ICM5 which is timed in overlapping relation to the contacts ICM2 (FIG. 9), the repeating relays will remain continuously energized until the relay RCR is deenergized. The relay RCR holds on its contacts 168 connected to the contacts ICM2 and remains continuously energized by its pulses overlapping those of the contacts ICM4 until its connection to the latter is subsequently broken.

The first pulse reaching the relay ALS (FIG. 6) also passes through its initial position to a terminal T59. This short circuits the relay FR (FIG. 5) and prevents a flash in the ensuing period "0" to "100." The switch ALS steps to its second position when the pulse is removed at the time "105."

The second pulse at the terminal T60 passes through the second position of the switch ALS to the terminal T59 to prevent a flash and to the terminal T42 (FIG. 4) to send a space entry to the adder (FIG. 3) from the switch SZJ and the relays PR2, PR4 and PR8.

The third pulse at the terminal T60 reaches a lead 170 through the switch ALS and energizes a relay IDC–1 at the time "165." This relay holds through a terminal T53 on the contacts ICM2 (FIG. 2). Also, the relay FR is energized through the terminal T53 to prepare the flash circuit if the relay TID is energized. Operation of the contacts of the relay IDC–1 (FIG. 5) closes the decoder circuits through keys 172. These keys are substituted for the repeating relay contacts to enable the operator to select the code of any character that may be desired as a leader character. The pulse on the lead 170 also reaches a terminal T57 (FIG. 6) if no leader characters are desired, thus energizing the repeating relay 256 (FIG. 2). If leader characters are desired, the pulse goes to a terminal T56 if the key "½ UL" is not depressed, energizing the relay 128. If the key "½ UL" is depressed the pulse goes to a terminal T55. Thus the selected leader character is flashed and spaced.

Succeeding pulses operate in the same manner as the preceding one until eventually a brush 174 of the switch ALS reaches a terminal connected with a brush 176 of the switch SZC, depending upon the position of the latter. This energizes the relay ALSR which opens the connection to the terminal T52. This occurs at the time "105" and the relay RCR is deenergized at the following time "180." During the next interval "0" to "130" the leader character is again flashed and spaced. The release of the relay RCR then permits the reading carriage to advance to the next code position.

Tabulation

In said application filed on even date herewith, apparatus is described for storing information to be used in tabulation including various positions of the text of each column in relation to its margins. In the preferred embodiment an auxiliary register is preferably used in order to make it unnecessary for the operator to retype any portion of the text. Thus a code "SAF" is entered at each register position in which a space stored in the auxiliary register in one or more consecutive transverse rows is to be inserted in the line.

We may first take the simpler case where no leader characters are desired in this space.

When the register reads the code "SAF" a terminal T51 is energized (FIG. 5). This energizes a relay AR (FIG. 2) which holds on its make contacts, opens the connections to the main register reading carriage sensing and advance magnets RCS and RCA, and connects the cam contacts ICM1 to the auxiliary register clutch CLU. The clutch operates the mechanism 26 to advance the tape one step. The space value sensed by the brushes 28 is sent to the register repeating relays and eventually operates the variable escapement in the manner described above under the heading "Characters and spaces." This operation is repeated and the clutch CLU is reenergized for each pulse from the contacts ICM1, with the spaces sensed in consecutive rows of the tape being sent to the variable escapement. Eventually, the "X" code signifying the end of a group of space punches is read, energizing a lead 178. This short-circuits the relay AR which restores the circuits for operation of the main register. It will be understood from a study of the above-mentioned application that the total of the spaces recorded between each pair of "X" codes in the tape equals the space to be inserted.

Where leader characters are to be inserted in the spaces mentioned above, the code entered in the register is "SAEF." When this code is read a terminal T54 is energized as well as the terminal T51, a relay IDC2 is energized and holds on its make contacts, and the relay IDC1 (FIG. 6) is energized. The relays IDC1 and IDC2 prepare the flash decoder circuits to substitute the character-selection keys 172 for the register repeating relay contacts as described under "Justifying leaders." A selected character is flashed for each step of the tape except for any tape position in which a width value "2," "4," "8," "16," "32" or "64" is punched. These values are effective to energize the terminal T59 through make contacts of the relay AR (FIG. 2), thereby short-circuiting the relay FR and preventing a flash. Thus a character is flashed only for each punch of value "128." When the "X" code is read the lead 178 sends a voltage through a terminal T50 (FIG. 2) to short-circuit the relay IDC2 and it also short-circuits the relay AR as in the previous case. The main register then steps to the next position.

Unit leading

In certain composing operations it is desired to perform a line spacing operation at a selected position in a given line for the purpose of photographing one or more characters above or below the line, for example subscripts or parts of mathematical formulae. In composing such a line, when the operator reaches a position requiring such line spacing, a code "SAD" is entered in the register. When the normal line position is to be resumed a code "SADF" is entered. The code "SAD" when read energizes a ratchet solenoid FFF through a terminal T82 (FIGS. 5 and 6) and the film is spaced a predetermined distance. In the following cam cycle the register moves to the next position. The characters are photographed in the alignment thus obtained until the code "SADF" is read. This causes energization of a ratchet solenoid FFR which returns the film to the original alignment.

Vertical rule

The machine herein described is adapted to compose characters in vertical as well as horizontal lines, for example to provide vertical rulings in tabulation. This operation is special in that it is not initiated by a code in the register. The operation is illustrated by the case where the last typed line has been photographed and the operator desires to insert a vertical rule. First, the keys 172 (FIG. 5) are depressed in the code combination corresponding to a vertical line or other character desired. Then, a key VRK (FIG. 6) is depressed. Through the terminal T53 this key connects the contacts ICM2 (FIG. 2) to the coil of a relay VRR which holds through its make contacts, a terminal T86 and contacts ICM4 (FIG. 5) which are timed to overlap the contacts ICM2. Thus the relay VRR remains continuously energized while the key VRK is held closed, and a continuous voltage is supplied to the coils of the relays IDC1 (FIG. 6), IDC2 (FIG. 5) and FR (FIG. 5), and to a continuous film drive mechanism 178. The character selected by the keys 172 is flashed on each cam cycle but no operation of the variable escapement occurs. Instead, the characters are flashed in vertical alignment. The speed of the drive mechanism 178 may be adjusted to cause the successive images to be spaced, connected or overlapping according to the effect desired. The length of the rule is determined by the time during which the key VRK is held depressed.

Double flashing and escapement

Large characters require more illumination than small characters to expose the film, and they require more space. To accommodate the larger size characters, provision is made to expose them twice in two successive cam cycles and to operate the variable escapement to produce twice the space represented by the repeating relays 2 to 256 for each character. Referring to FIG. 8, contacts 180 are connected to a relay TC and are associated with projections 181 on the lens support 128. These projections are positioned to close the contacts while a lens for such a size is in the axis 132.

The operation is illustrated by taking a typical character for which the code is sensed during closure of the cam contacts ICM2 (time "95" to "180"). At the time "175" cam contacts ICM5 close (FIG. 2) and find a circuit (FIG. 6) through contacts of the relay TC to the operating coil of a stepping switch RPT. (However, this switch will not step until the impulse ends at the time "130.") A circuit through the terminal T52 at the time "175" also energizes the relay RCR (FIG. 2) which interrupts the register advance and sensing solenoids as previously described and holds the repeating relays energized.

The character is flashed the first time in the following period "0" to "100" but is not spaced due to interruption of the circuit between the terminals T83 and T84 by opening of break contacts of the relay TC (FIG. 3).

At the time "130" the switch RPT steps to its second position connecting the terminals T83 and T84 and at the time "175" a second impulse reaches the switch RPT stepping coil. The character is flashed a second time in the following interval "0" to "100," and spaced through closure of the cam contacts ICM6 or ICM11 as described above under "Characters and spaces."

At the next time "130" the switch RPT steps to its third position again connecting the terminals T83 and T84, and energizing the relay ALSR to deenergize the relay RCR and allow the reading carriage to advance in the next interval "15" to "45." The third position also connects a brush of the switch RPT through the terminal T59 to short-circuit the relay FR (FIG. 5) and prevent a flash in the following interval "0" to "100." However, a second spacing operation is produced through closure of the cam contacts ICM6 or ICM11 in the time interval "95" to "130" or "55" to "90" as the case may be.

At the next time "130" the switch RPT steps to its next position and the operation is repeated for the next character in the register. It will be understood that every third position of the switch RPT is identical and that the switch advances in the same direction by three steps each time a character is transcribed. It will be further understood that the circuit may be readily adapted for either the double flashing or the double escapement operation alone, and that any other multiple of flashes or escapements may be readily produced by adding steps to the switch RPT.

End-of-line code

As described in said application Serial No. 531,023, the operator initiates the calculations necessary for justification and subsequent transcription when the storage of a line has been completed. This is done by depressing a carriage return key CRK described therein. In addition to returning the carriage of the non-justifying typewriter, this key also sends a code "SAC" to the register if the style of the characters last selected is on one-half of the character disk, or a code "SABC" if the style is on the other half of the disk. Preferably, this is done by means of contacts mechanically associated with the style shift lever described in said application Serial No. 500,-397. Referring to FIG. 5 herein, it will be observed that either code combination energizes a terminal flr-11, that if the relay "B" is not energized the terminal T78 is energized, and that if the relay "B" is energized the terminal T77 is energized. These terminals are connected to the style shift relay SHR.

Thus apparatus is provided to cause a 180 degree style shift at the end of each transcribed line if necessary to insure that the half of the disk last selected by the operator for the line just transcribed is the half which will be photographed at the start of the next line and until a different style shift code is sent to the register.

In any case, energization of the terminal flr-11 signals the end of the transcription of the line and resets the computing apparatus for initiating the computations for the next line as described in said application Serial No. 531,023.

It will be recognized that while the invention described above has been described as embodied in a specific preferred form, various modifications therein and adaptations thereof may be employed by one skilled in this art without departing from the spirit or scope of the invention.

Having thus described the invention, we claim:

1. In apparatus for type composition, a rotatable shaft having an angular position for each of a number of fonts, a register to represent the characters in a line of type and a distinctive code for each of said fonts to be inserted at a selected position in said line, and transcription means including cyclically operated means to read the characters and font codes successively from the register and to space the characters, a decoder associated with said shaft, connections from said cyclically-operated means to said decoder, a circuit to rotate the shaft and to interrupt the cyclic operation of said reading means, and means to reinstate said cyclic operation and to stop the shaft when the decoder reaches a position which matches said code.

2. In apparatus for photocomposition, the combination of a rotatable support bearing a number of lenses having different magnifications, a register to represent the characters in a line of type and a distinctive code for each lens, and transcription means including a decoder mechanically engaged with said support, connections to said decoder operable by a code in the register, pawl means to engage the support, said support having notches each to receive the pawl when a corresponding lens is in photographing position, means to disengage the pawl and rotate the support, and means including said connections to stop the support and engage the pawl in a position of the decoder which matches said code.

3. In apparatus for photocomposition, the combination of a rotatable support bearing a number of lenses having different magnifications, a register to represent the characters in a line of type and a distinctive code for each lens, and transcription means including a decoder associated with said support, connections to said decoder operable by a code in the register, pawl means to engage the support, said support having notches each to receive the pawl when a corresponding lens is in photographing position, fast drive means engageable to rotate the support, means operable to disengage the pawl and to engage the fast drive means with the support, means to drop the pawl upon the support between two notches when the decoder is in a position matching said code, slow drive means engageable to rotate the support, a circuit operable by the pawl when it rests on the support between two notches to disengage the fast drive means and engage the slow drive means, and means to disengage the slow drive means when said pawl falls in the next notch.

4. In photographic composing apparatus, a continuously rotating character carrier bearing the characters to be photographed in a circle, said characters in one portion of the circle requiring more space than those in another portion, an intermittent flash device to illuminate a character in a projection position, projection means to project the character onto a sensitized sheet, decoder means associated with the character carrier and operative to select a particular character for illumination, spacing means operative to space the characters on the sheet, and timer means to cause operation of the flash device through the decoder alternately with said spacing means, said timer means including means to advance the operation of the spacing means when a character in said first-mentioned portion is projected.

5. In photocomposing apparatus, the combination of a support bearing characters to be photographed, a support bearing a number of lenses of different magnifications selectively interposable in a photographing position, cyclic means to photograph successive selected characters from said support through a selected lens, and means operatively associated with said lens support to cause said cyclic means to photograph a predetermined plurality of images of each selected character one upon the other when a particular lens is selected.

6. In photocomposing apparatus, a continuously rotating character carrier bearing the characters to be photographed, in a circle, said circle comprising two fonts on opposite halves thereof, continuous cams engaged with the character carrier, character photographing and spacing circuits, intermittent cams engaged with the continuous cams through a half-revolution clutch and adapted to operate the photographing and spacing circuits in consecutive halves of a single revolution, and font changing means to cause a selected font to pass a projection position during the photographing half of said revolution including means to disengage the clutch and reengage it in 180-degree phase shifted relation to said character carrier.

7. In photocomposing apparatus, a continuously rotating character bearing the characters to be photographed, in a circle, said circle comprising two fonts on opposite halves thereof, continuous cams engaged with the character carrier, character photographing and spacing circuits, intermittent cams engaged with the continuous cams through a half-revolution clutch and adapted to operate the photographing and spacing circuits in consecutive halves of a single revolution, and an automatic font selection circuit to cause a selected font to pass a projection position during the photographing half of said revolution including a bistable relay adapted to remain in a position corresponding to said font, contacts associated with the continuous cams and contacts of the intermittent cams, and means to disengage the clutch and reengage it in 180-degree phase shifted relation to said character carrier.

8. In type composing apparatus, the combination of a support bearing a number of lenses of differing magnifications for selective interposition in a projection axis, a register to store coded information corresponding to the characters and spaces in a line of type and lens codes corresponding to each of said lenses in positions of the line where the magnification is changed, repeating relays operable by the register to represent the space allotted to each character in digital form, lens changing means associated with the repeating relays and responsive to a lens code to change the lens interposed in said axis, and a relay operable by said lens code to transfer the energizing connections from the register to said relays to multiply the register value represented thereby.

9. In type composing apparatus, the combination of a main register for storing information corresponding to the characters in a line of type and a code representing the insertion of a tabulation leader space, an independently-operable auxiliary register in which the numerical value of said space is stored, transcription means including apparatus to read, photograph and space the characters in a selected line in the main register consecutively, and a relay energizable by said code to cause the transcription means to read the information in the auxiliary register to cause the leader space to be inserted in said line.

10. In type composing apparatus, the combination of a main register for storing information corresponding to the characters in a line of type and a code representing the insertion of a tabulation leader space, an auxiliary register in which the numerical value of said space is stored, and transcription means including apparatus to read, photograph and space the characters in the main register consecutively, and a relay energizable by said code to substitute the auxiliary register for the main register to cause the leader space to be inserted in the line, said auxiliary register having a code following said tabulation leader space therein to deenergize said relay.

11. In apparatus for type composition, leader transcription means comprising, in combination, a main register to represent the characters and spaces in a line of type and a leader code in a selected position in said line, a justification register having means to represent a multiple of a space of predetermined width value that will fit within the space required to justify the line, and transcription means responsive to the information in the main register to transcribe and space the characters in said line successively, said transcription means being responsive to said leader code to transcribe said multiple of said predetermined width value in said line from the justification register.

12. In apparatus for type composition, leader transcription means comprising, in combination, a main register to represent the characters and spaces in a selected line of type and a leader code in a selected position in said line, a justification register having means to represent a multiple of a space of predetermined width value that will fit within the remaining space required to justify the line, transcription apparatus to transcribe the characters represented in the main register successively, spacing means to space the transcribed characters in a line, means associated with the transcription apparatus and operable by said leader code to select a leader character for transcription, and means responsive to said code and adapted to alternately transcribe said leader character and introduce said predetermined width value in the line, the last-mentioned means being adapted to become unoperative after the number of introduced spaces of said predetermined width in said line equals said multiple.

13. The combination according to claim 11, wherein the justification register also has means to represent any difference between the justified line length and said multiple of said predetermined space, and said means responsive to said code introduces an additional space equal to said difference.

14. In apparatus for type transcription, the combination of a rotatable disk bearing a plurality of fonts of characters arranged in concentric circles, a support for a sensitized sheet, optical projection means in position to project the image of a character in a selected circle on to said sheet, pivot means to pivot the axis of said circles about a second axis to change the selected circle for projection, a register to represent the characters in a line of type and a distinctive code for each circle, a decoder mechanically associated with said pivot means, means responsive to said code in the register to operate the pivot means, and means to arrest the pivot means when a code in the decoder matches a code in the register and a selected circle is in position for projection.

15. In apparatus for type transcription, the combination of a rotatable disk bearing a plurality of fonts of characters arranged in concentric circles, a support for a sensitized sheet, optical projection means in position to project the image of a character in a selected circle on to said sheet, pivot means to pivot the axis of said circles about a second axis to change the selected circle for projection, pawl means to engage the pivot means positively in each position which presents a circle for projection, a register to represent the characters in a line of type and a distinctive code for each circle, a decoder mechanically associated with said pivot means, means responsive to said code in the register to operate the pivot means, and means to arrest the pivot means and engage the pawl therewith when a code in the decoder matches a code in the register and a selected circle is in position for projection.

16. In photocomposing apparatus, the combination of a continuously rotatable character carrier bearing the characters to be photographed in a circle, said circle comprising two fonts on opposite halves thereof, a support for a sensitized sheet, optical means to project a character from said carrier on to said sheet, timing cams having a half-revolution clutch engageable with the character carrier, transcription means connected through said timing cams for projecting a character in one font and spacing the character while the other font is in operative relation to the optical means, and a font change device operable to disengage the clutch and reengage it in 180-degree phase shifted relation to said character carrier.

17. In apparatus for photocomposition, the combination of a rotatable support mounted on a shaft and bearing a number of lenses having different magnifications, a register to represent the characters in a line of type by consecutive codes including a distinctive code for each selected lens, a decoder having a plurality of coded electrical contact members mounted on said shaft, a circuit operated by the register according to a code therein to make connection to selected contact members, and means controlled by said circuit through said members to rotate the support, said circuit having provision to stop the rotation of the support to present in a photographing position a lens corresponding to a code in the register.

(References on following page)

References Cited in the file of this patent

UNITED STATES PATENTS

| | | |
|---|---|---|
| 1,564,879 | Mathews | Dec. 8, 1925 |
| 1,732,049 | Hunter | Oct. 15, 1929 |
| 2,229,689 | Westover | Jan. 28, 1941 |
| 2,229,690 | Westover | Jan. 28, 1941 |
| 2,533,242 | Gridley | Dec. 12, 1950 |
| 2,594,731 | Connolly | Apr. 29, 1952 |
| 2,714,843 | Hooven | Aug. 9, 1955 |
| 2,786,400 | Peery | Mar. 26, 1957 |
| 2,790,362 | Higonnet | Apr. 30, 1957 |
| 2,831,410 | Walden | Apr. 22, 1958 |
| 2,847,919 | Rossetto | Aug. 19, 1958 |

FOREIGN PATENTS

| | | |
|---|---|---|
| 1,113,397 | France | Dec. 5, 1955 |